(12) United States Patent
Ueda

(10) Patent No.: US 10,346,475 B2
(45) Date of Patent: *Jul. 9, 2019

(54) HASH TABLE STRUCTURES

(71) Applicant: INTERNATIONAL BUSINESS MACHINES CORPORATION, Armonk, NY (US)

(72) Inventor: Takanori Ueda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/914,305

(22) Filed: Mar. 7, 2018

(65) Prior Publication Data

US 2018/0196887 A1    Jul. 12, 2018

Related U.S. Application Data

(63) Continuation of application No. 14/982,019, filed on Dec. 29, 2015, now Pat. No. 9,971,850.

(51) Int. Cl.
  *G06F 16/901*  (2019.01)
  *G06F 12/1018* (2016.01)
(52) U.S. Cl.
  CPC ...... *G06F 16/9014* (2019.01); *G06F 12/1018* (2013.01)
(58) Field of Classification Search
  CPC .................. G06F 12/1018; G06F 17/30949
  See application file for complete search history.

(56) References Cited

U.S. PATENT DOCUMENTS

| | | | |
|---|---|---|---|
| 7,058,639 B1* | 6/2006 | Chatterjee | G06F 17/3033 |
| 7,145,911 B2 | 12/2006 | Gooch et al. | |
| 2008/0201290 A1* | 8/2008 | Ponmudi | G06F 17/30306 |
| 2011/0043387 A1* | 2/2011 | Abali | H03M 7/3088 |
| | | | 341/51 |
| 2013/0318034 A1* | 11/2013 | Bawa | G06F 17/30592 |
| | | | 707/602 |
| 2016/0124864 A1* | 5/2016 | Sun | G06F 12/1018 |
| | | | 711/216 |
| 2016/0371267 A1* | 12/2016 | Narasimha | G06F 17/3033 |

OTHER PUBLICATIONS

Przemyslaw Zalewski et al., Case Study on FPGA Perfromance of Parallel Hash Functions, ISSN 0033-2097, R. 86 NR 11a/2010 (Year: 2010).*

(Continued)

*Primary Examiner* — Ryan Bertram
*Assistant Examiner* — Edmund H Kwong
(74) *Attorney, Agent, or Firm* — Tutunjian & Bitetto, P.C.; Vazken Alexanian

(57) ABSTRACT

Described herein are hash table structures and system and methods for creating and storing data in the hash table structures. Hash tables and input buffers associated with same are configured in several arrangements, including multi-level hash tables and nested multi-level hash tables. The hash table structures described herein are well suited for being configured in the memory blocks of field-programmable gate arrays.

20 Claims, 13 Drawing Sheets

(56) References Cited

OTHER PUBLICATIONS

Stack overflow, when do we prefer Round Robin over FCFS and vice-versa?, 2014 https://stackoverflow.conn/guestions/1472413/when-do-we-prefer-round-robin-over-fcfs-and-vice-versa (Year: 2014).*

Przemyslaw Zalewski et al., Case Study on FPGA Performance of Parallel Hash Functions, Przegla, D Elektrotechnlczny (Electrical Review), ISSN 0033-2097, R. 86 NR 11a, 2010.

Udit Dhawan et al., Area-Efficient Near-Associative Memories on FPGAs, ACM Transactions on Reconfigurable Technology and Systems, vol. 7, No. 4, Article 30, Publication date: Jan. 2015.

Andrei Z. Broder et al., Multilvel Adaptive Hashing, roceedings of the First Annual ACM-SIAM Symposium on Discrete Algorithms, Jan. 22-24, 1990, San Francisco, California.

Adam Kirsch, et al., Simple Summaries for Hashing With Choices, IEEE/ACM Transactions on Networking, vol. 16, No. 1, Feb. 2008.

Adam Kirsch, et al., The Power of One Move:Hashing Schemes for Hardware, IEEE/ACM Transactions on Networking, vol. 18, No. 6, Dec. 2010.

Udit Dhawan, et al., Area-Efficient Near-Associative Memories on FPGAs, FPGA'13, Feb. 11-13, 2013, Monterey, California, USA.

List of IBM Patents or Patent Applications Treated as Related dated Mar. 7, 2018, 2 pages.

* cited by examiner

HASH TABLE STRUCTURES

BACKGROUND

Technical Field

The present invention relates to hash table structures, particularly to multi-level hash tables (MHTs) and nested multi-level hash tables (NMHTs), and to hash table configurations in field programmable gate arrays.

Description of the Related Art

MHTs provide a high space efficiency approach to storing keys in a hash table. In a MHT, a hash table is divided into multiple blocks by using different hash functions. This approach improve the space efficiency of key storage.

A Field Programmable Gate Array (FPGA) is a semiconductor device that is programmable in the field after manufacturing. A FPGA has a large number of logic gates in an array and have exhibit parallel computation abilities.

FPGA chips have small memory blocks that can hold only a relatively small number of data entries per block. In each clock cycle, FPGA logic circuits can read or write only one data entry stored in one memory address of a memory block. Thus, the throughput of a hash table built in FPGA memory blocks could be limited by the clock frequency of the FPGA.

SUMMARY

According to present principles, described herein is a method for hash table storage, in which hash table storage locations are created in memory blocks of a field programmable gate array. Buffers could also be created in the memory blocks of the field programmable gate array, or in another locations, such as, for example, the registers of the field programmable gate array. Each input buffer associated with one or more selected hash tables and receives keys for storage in the associated hash tables. One or more hash value calculations are performed on the keys to be stored in storage destinations present in the plurality of hash tables. The hash value calculations determine the selected input buffers and storage destinations in the hash tables. Based on the calculations, keys are forwarded to one or more selected input buffers, and the keys are transferred from the input buffers to selected storage destinations in the hash tables that are associated with the buffers, the storage destinations being selected on the basis of the calculated hash values for the keys.

Further in accordance with present principles, described is a system for hash table storage, which system includes a hash table and input buffer generator is configured in memory blocks of a field programmable gate array in order to create hash tables and input buffers where keys and determined hash values will be received and stored. The hash table and input buffer generator associates each one of the input buffers with one or more hash tables. The input buffers receive keys to be stored in the hash tables and distribute keys to one or more hash tables.

The system further includes a hash value determiner to perform hash value calculations on the keys that select input buffers where keys will be forwarded on the basis of determined hash values. Further, the system includes a key selection sequencer, for selecting a key from among keys in the input buffers for transfer to a multi-level hash table.

Further in accordance with present principles, described is a computer program product of hash table storage, the computer program product comprising a non-transitory computer readable storage medium having program instructions embodied therewith, the program instructions being executable by a computer to cause the computer to perform a method comprising the creating of hash table storage locations in memory blocks of a field programmable gate array. The program instructions also cause the creation of buffers in memory blocks which are associated with one or more selected hash tables. The input buffers receive keys for storage in the associated hash tables. The program instructions also cause one or more hash value calculations to be performed on the keys to be stored in storage destinations present in the plurality of hash tables. The hash value calculations determine the selected input buffers and storage destinations in the hash tables. Based on the calculations, keys are forwarded to one or more selected input buffers, and the keys are transferred from the input buffers to selected storage destinations in the hash tables that are associated with the buffers, the storage destinations being selected on the basis of the calculated hash values for the keys.

The hash tables are arranged in series. In a visualization, the tables can be laid out left to right, and for discussion purposes, this table orientation is helpful.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

According to present principles, described is a system and method for building hash tables (e.g., associative memory) in computing environments, and particularly in FPGAs. The present principles may be implemented in other hardware devices, e.g., application specific integrated circuits (ASICs), or in software.

In one particular embodiment, a NMHT data structure is configured from a number of MHTs. Multiple hash functions, e.g., mappings, are employed to associate a key to be stored to a selected input buffer or buffers associated with hash table structure and to select a possible storage destination in a hash table structure. Multiple candidate storage locations for keys are found that the key is stored in a location that has available memory space. In one embodiment, a MHT is used as the data structure for a storage location.

Building hash tables (e.g., associative memory) in FPGA may be attractive because the FPGA chip structure supports fast data retrieval. Hash tables built in FPGAs could be able to process multiple keys in each clock cycle by exploiting the parallel computation ability of FPGAs, thereby achieving high throughput processing.

FPGAs have memory blocks that can hold small numbers of data entries. However, FPGA logic circuits can read or write only one data entry stored on one memory address of a memory block in each cycle. Thus, the throughput of a hash table build with memory blocks is limited by the clock frequency of the FPGA.

Processing hash tables configured in a FPGA can take place with high throughput because FPGAs have parallel computation capability. Multiple hash table keys could be processed in each clock cycle, taking advantage of the high throughput processing offered by parallel computing. This could particularly be the case if MHTs and NMHTs are configured in a FPGA, which could further increase the number of keys processed in a clock cycle.

Figure 1:
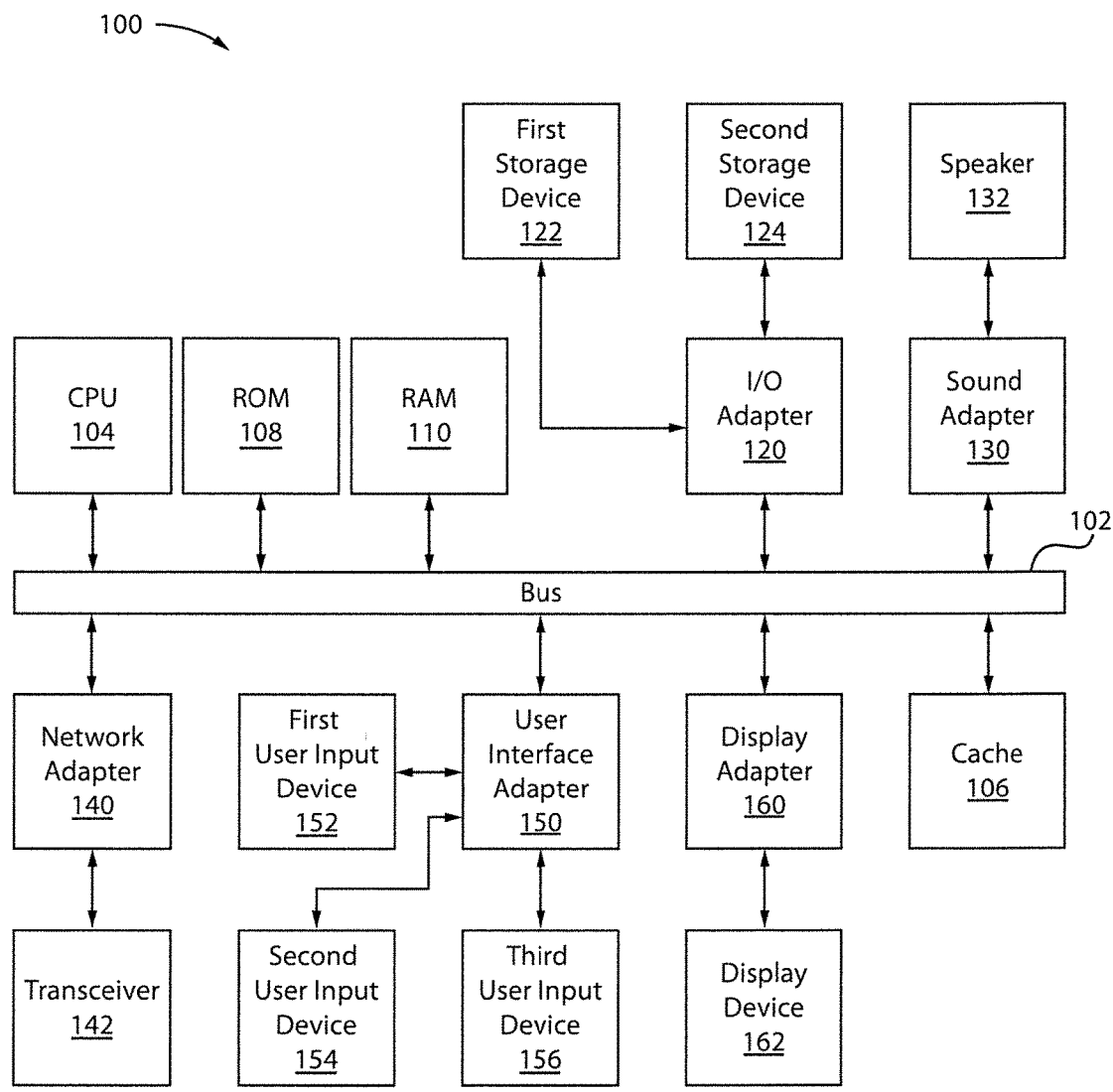
FIG. 1 shows an exemplary processing system to which the present principles may be applied.

Referring to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154 and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

The processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

Figure 2:
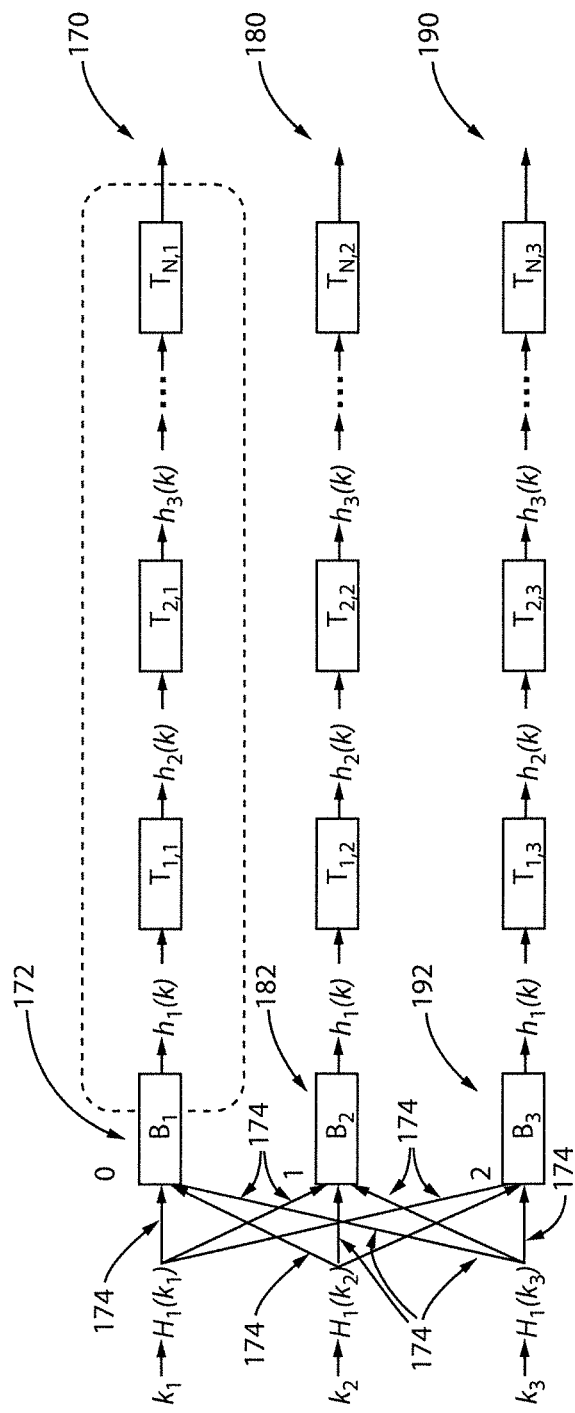
FIG. 2 shows a configuration of hash tables and input buffers in accordance with one embodiment of present principles.

Referring to FIG. 2, a hashing scheme is shown in which MHTs 170, 180, and 190 are arranged horizontally e.g., top level MHT 170 includes hash tables $T_{1,1}$, $T_{2,1}$, $T_{N,1}$; middle level MHT 180 includes hash tables $T_{1,2}$, $T_{2,2}$, $T_{N,2}$, and so on. Each MHT 170, 180, 190 is associated with a buffer, e.g., MHT 170 is associated with a buffer 172, MHT 180 is associated with buffer 182 and MHT 190 is associated with buffer 192. The buffers 172, 182 and 192 are configured in a memory unit. The buffers receive keys to be stored in the associated hash tables.

A hash function $H_1$ partitions the keys, e.g., keys $k_1$, $k_2$, $k_3$, etc. and generates first hash values $H_1(k_1)$, $H_1(k_2)$, $H_1(k_3)$, etc. for the keys. As shown, the returned hash value could be one of 0, 1, or 2, and depending on the hash value returned, the keys are distributed to the buffers 172, 182 or 192. Arrows 174 indicate the possible paths any key might take in being distributed among the input buffers 172, 182, and 192.

Additional hash values are computed for the keys dispatched to the buffers 172, 182 and 182 by hash functions $h_1$, $h_2$, etc. to determine the storage destinations, e.g., slots in hash tables $T_{1,1}$, $T_{2,1}$, $T_{N,1}$, of MHT 170. When the hash tables are configured in a FPGA, the storage destinations or slots are the memory blocks of a FPGA. By way of example, for a hash table configured in a memory array with 256 entries (e.g. identified 0 to 255), then the hash function returns a value of 0 to 255 and directs the key to the corresponding storage destination in the table. Hash function $h_1$ would return one hash value. Hash function $h_2$ would return another hash value, with high probability that the hash value returned by hash function $h_2$ for a given key would differ from the hash value returned by hash function $h_1$ for the given key. This approach presents good throughput and uniform distribution of the keys.

Additional hash value determinations may be preferable in certain instances to insure good hash partitioning, e.g., distribution of the keys among all buffers and tables. In some cases an initial hashing may return an inordinate number of hash values of, e.g., 0. In this case, most or all keys would be sent to the top level MHT 170.

Figure 3:
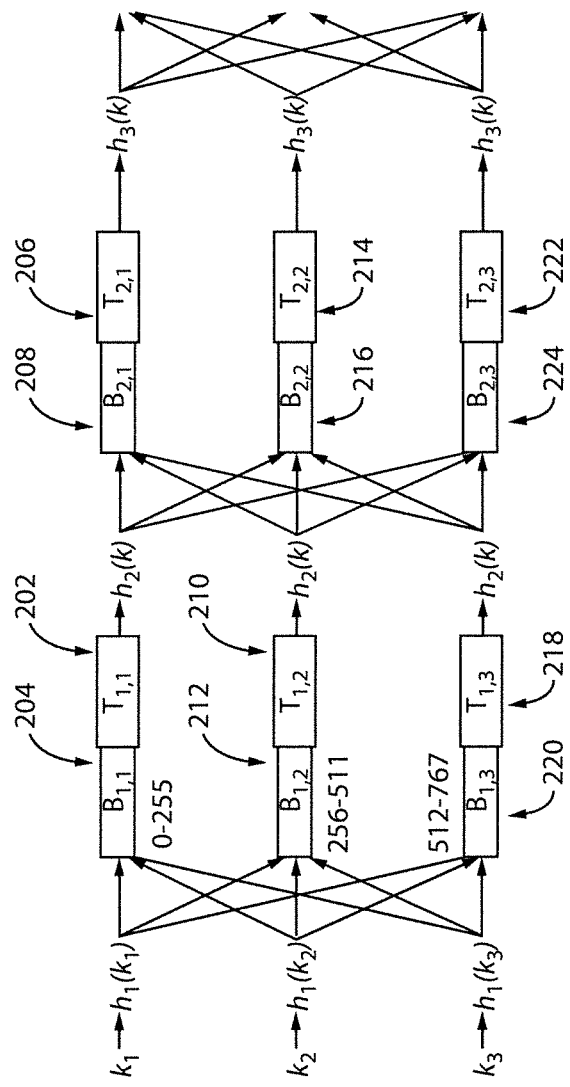
FIG. 3 shows a configuration of hash tables and input buffers in accordance with one embodiment of present principles in which a buffer is associated with each hash table.

Referring to FIG. 3, an arrangement according to present principles is shown in which hash partitioning is performed multiple times. Further, each hash table is associated with an input buffer. For example, hash tables 202, 206, 210, 214, 218, and 222 are associated with input buffers 204, 208, 212, 216, 220 and 224 respectively. Hash partitioning on the keys $k_1$, $k_2$, $k_3$, etc. is performed by hash functions $h_1$, $h_2$, $h_3$, etc. in order to select and determine the input buffers 204, 208, 212, etc. the keys are to be sent. The buffers 204, 208, 212, etc. distribute the keys to storage locations. The buffer configuration is advantageous since multiple keys may arrive in each clock cycle. The buffer provides a waiting location for sending keys to their destinations.

Merely by way of example, the partitioning hash function that is performed in the incoming keys returns hash values from 0 to 767, and the keys are distributed among the tables depending on the hash value determined for each key. For example, if a computed hash function of a key returns a hash value of 0-255, it is forwarded to the top level of tables; if a computed hash function of a key returns a hash value of 256-511, it is forwarded to the mid-level tables; and if a computed hash function of a key returns a hash value of 512-767, it is forwarded to the bottom level of tables. With this arrangement, frequent partitioning to determine hash values occurs, and high storage space efficiency associated with MHT configurations are realized. Thus, even if the hash values of keys always fall in the range of 0-255 and are accordingly transferred to hash table $T_{1,1}$ due to the biased deviation of the hash values, the next hash function $h_2$ can distribute the keys to multiple tables $T_{2,1}$, $T_{2,2}$, $T_{2,3}$. With this arrangement, better space efficiency can be realized, such as when hash functions are calculated only once, at the front end of the tables. This kind of arrangement is configurable in a FGPA since it has literally thousands of memory blocks.

Figure 4:
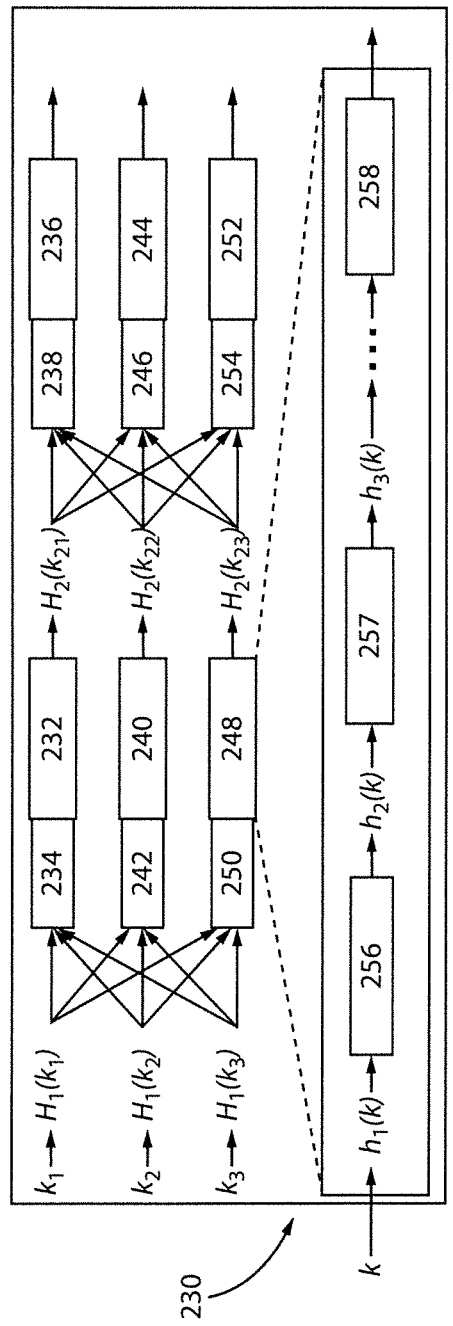
FIG. 4 shows a nested multi-level hash table configuration that includes multi-level hash tables with one input buffer for each multi-level hash table in accordance with one embodiment of present principles.

Referring to FIG. 4, depicted is a nested multi-level hash table configurable in a FPGA. Six MHT's 232, 236, 240, 244, 248 and 252 are shown inside NMHT 230. Each MHT in this configuration includes a plurality of hash tables. For example, hash tables 256, 257 and 258 are configured in MHT 248. Buffers 234, 238, 242, 246, 250 and 254 are respectively associated with MHTs 232, 236, 240, 244, 248 and 252. The NMHT arrangement uses multiple partitioning hash functions (e.g., $H_1$, $H_2$) that generate hash values (e.g., $H_1(k_1)$, $H_1(k_2)$, $H_1(k_3)$, $H_2(k_{21})$, $H_2(k_{22})$, $H_2(k_{23})$) that determine to which of the buffers the keys (e.g. $k_1$, $k_2$, $k_3$, etc.) are forwarded. For example, buffer 234 may receive keys for MHT 232 in accordance with the hash values computed by hash functions $H_1(k_1)$, $H_1(k_2)$, $H_1(k_3)$. Further by way of example, buffer 246 may receive keys for MHT 244 in accordance with the hash values computed by hash functions $H_2(k_{21})$, $H_2(k_{22})$, $H_2(k_{23})$. Keys are further distributed among the hash tables of the individual MHTs as show at the bottom of FIG. 4, where hash functions $h_1$, $h_2$, $h_3$ specifically associate the keys with storage destinations tables 256, 257, 258 that constitute the MHT248.

According to present principles, the NMHT structure, e.g., the structure 230 of FIG. 4, uses multiple hash functions to perform multiple hash computations that associate keys to input buffers and storage destination in the MHT structures of the NMHT. With this arrangement, multiple candidate storage locations may be found for storing each key.

In one particular embodiment, hash functions $H_1$ and $H_2$ respectively generate hash values for three (3) of the MHTs each. With this approach, the number of logic circuits for buffer configuration and hash partitioning is smaller than that of the method in FIG. 3 because the number of buffers is smaller than that of the method in FIG. 3.

NMHT data structures can be used recursively as the data structure for a storage location, e.g., in lieu of an MHT structure. The storage location candidates for multiple keys are computed in parallel. The input buffers associated with the MHT structures receive and hold keys arriving at the storage locations for further processing.

Buffers 234, 238, 242, etc. are configured to have the same number of first in, first out (FIFO) queues and widths, e.g., the same number of key inputs that are processed per clock cycle. In one embodiment, a round robin strategy is employed to fetch keys for storage from a buffer location. Keys are stored according to a predetermined priority order when the storage (e.g. an MHT) has available storage locations. Keys $k_1$, $k_2$, and $k_3$ are shown passing from the left storage locations to the right storage locations which could result in the left most storage locations being the ones first filled with keys.

Figure 5:
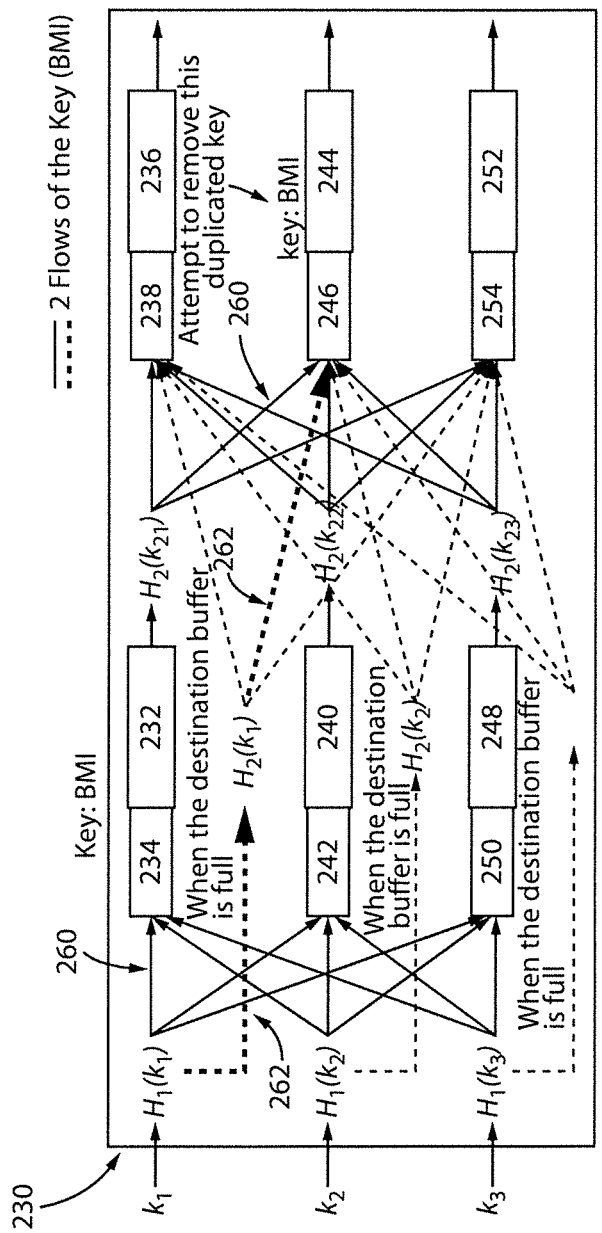
FIG. 5 shows a nested multi-level hash table configuration of hash tables and input buffers in accordance with one embodiment of present principles in which keys are forwarded if a buffer is full.

Referring to FIG. 5, a NMHT is depicted in which a key forwarding process is employed to forward a key to a storage location when the buffer to which it is directed is full and cannot accept more keys. The NMHT configuration is similar to the configuration of FIG. 4 and thus the components of FIG. 5 are numbered as in FIG. 4.

The flow of an exemplary key "BMI" is shown as it passes from the left side MHTs to the right side MHTs. For example, when the computed hash value determines that a key is to be forwarded to a buffer that is full, e.g. key "BMI" being routed to buffer 234, the hash function $H_1$ forwards the key to hash function $H_2$ for a computation of a hash value that, by way of example, forwards the key to buffer 246 configured for MHT 244. This is exemplified by the flow of the key "BMI", which can flow along the solid 260 (when buffer 234 is not full at the time the key arrives) or dotted lines 262 (when buffer 234 is full when the key arrives). Thus key "BMI" can flow along two different paths. Yet, in view of the computed hash value for key BMI, it arrives at buffer 244 regardless of the path taken to get there.

The key forwarding approach, which in one embodiment is implemented when a buffer is full, avoids the delay in processing keys which would occur when a buffer to which a key is directed is full at the time of key arrival. While buffer 234 is shown as being full of keys, a buffer could reach a full condition be anywhere in the hash table structure. According to present principles, the key ends up in the appropriate storage location even when the key forwarding is employed.

To prevent duplication of keys as the waste of storage space in memory due to duplicated keys, the duplicate keys can be deleted. When keys arrive at the same storage location, there is an attempt to delete one of the duplicates. For example, two version of key BMI may arrive at buffer 246. In this instance, one of the two keys would be deleted. The method is described below.

Figures 6, 7:
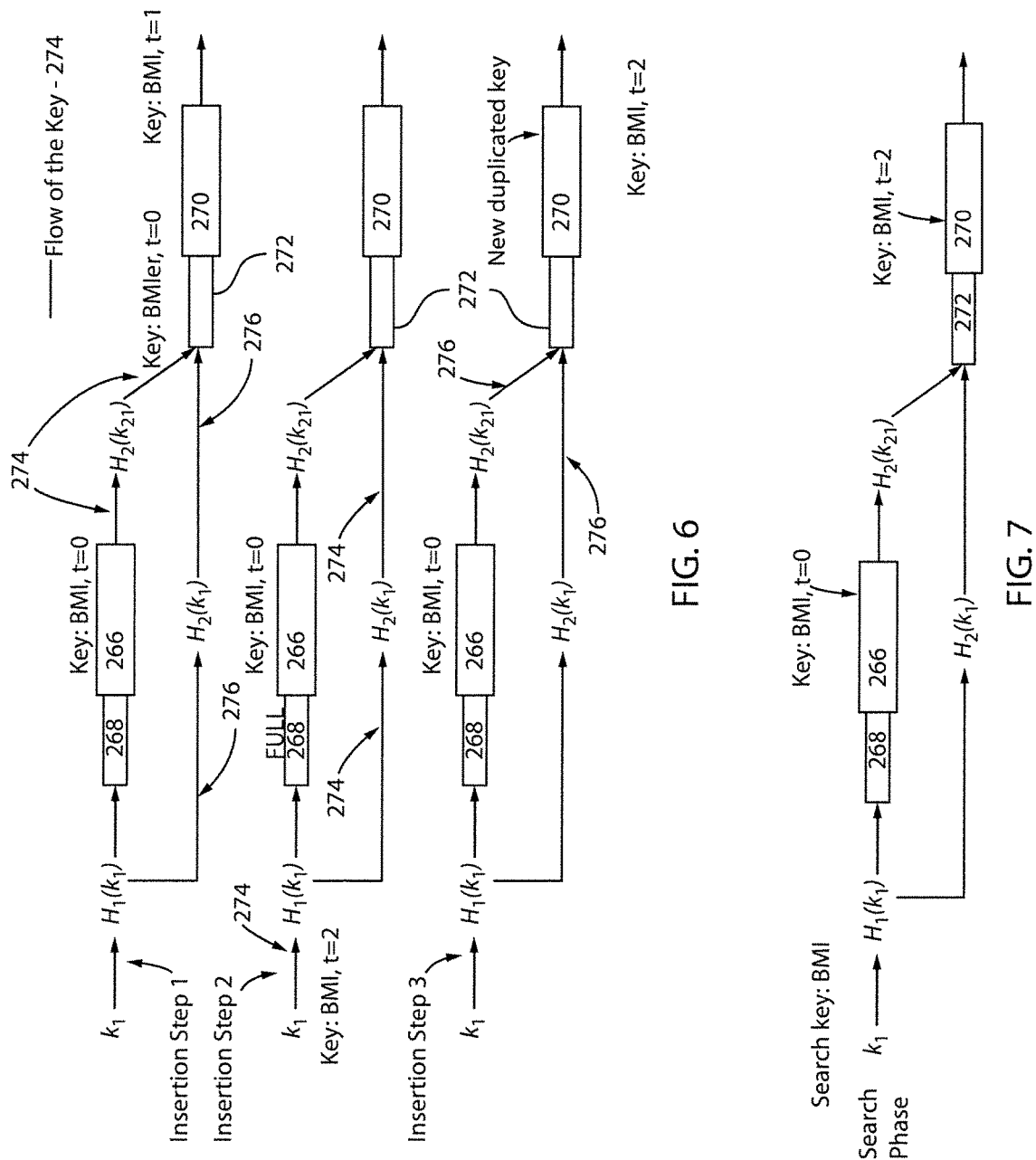
FIG. 6 shows a key de-duplication method in accordance with an embodiment of present principles.
FIG. 7 shows a key de-duplication method in accordance with an embodiment of present principles.

Referring to FIG. 6, an approach to deleting duplicated keys is described. Insertion steps nos. 1, 2 and 3 are shown for the key BMI. According to present principles, the keys are time stamped, e.g., when the initial hash values are computed, or when the keys are generated by data sources such as a router or a sensor (not shown). For example, there are several duplicates of key BMI, e.g., key BMI, t=0, key BMI, t=1 and key BMI, t=2. In insertion step 1, buffer 268 associated with MHT 266 is not full and receives key BMI, t=0. MHT 266 holds the key in a storage location. Then, if key BMI, t=1 arrives at $H_1$ and the buffer 268 is full, the key is transferred to buffer 272 and inserted in a storage location in MHT 270. At this point, there are two duplicated keys BMI, t=0 in MHT 266 and t=1 in MHT 270. Then, a further hash value for key BMI, t=0 is computed by the $H_2$ hash function and it is transferred to buffer 272. Finally, MHT 270 can detect the duplication because it receives the duplicated key. In insertion step 2, MHT 270 deletes the new key (t=1) depending on the time stamp if the application using this NMHT needs to hold older keys. Here, key BMI, t=0 flows along the top path 274, though key BMI, t=1 moves along path 276.

Insertion step 3 depicts a situation that occurs when buffer 268 is still at capacity. Here, the hash function $H_1$ passes key BMI t=2 to hash function $H_2$, bypassing the full buffer 268. Hash function $H_2$ computes the hash value of the key and it arrives at buffer 272 for storage in MHT 270. Key BMI t=2 moves along flow path 276, and arrives at MHT 270. MHT 270 stores the BMI t=2 to a storage location inside of it.

FIG. 7 shows an arrangement in which keys are searched for by name when there are two duplicated keys. In this instance, when duplicate keys are located (e.g., key BMI t=0 in storage location 266 and key BMI t=2 in storage location 270, then the selection could be made on a predetermined criteria, such as selecting the key that has the oldest time stamp. In this instance, key BMI t=0 would be a search result.

Figure 8:
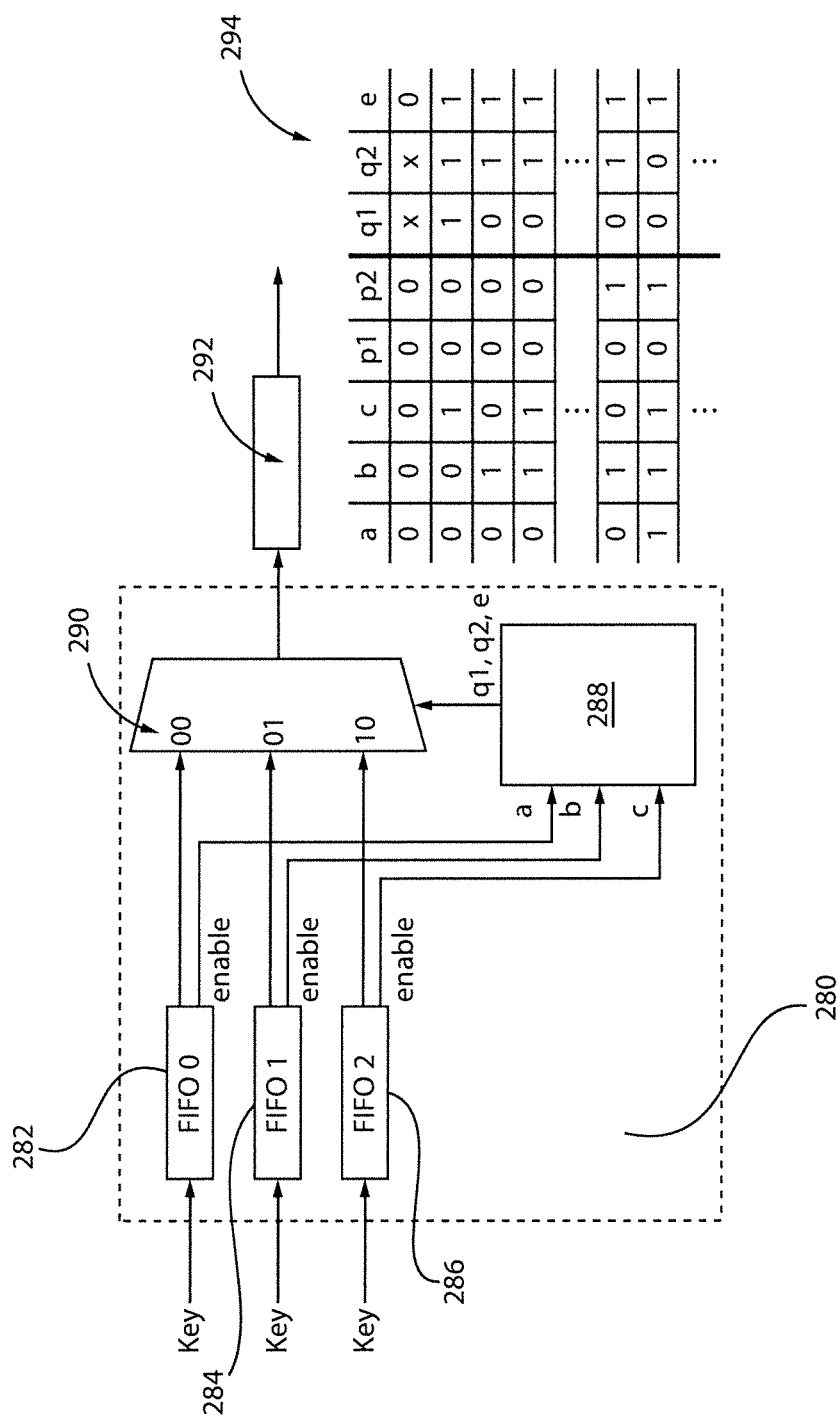
FIG. 8 shows a key selection sequencing architecture and method for selecting a key to be transferred to a hash table for storage, in which the key is selected from among several keys received in an input buffer in accordance with an embodiment of present principles.

FIG. 8 depicts an exemplary implementation of a buffer 280 in accordance with present principles and the manner in which it select the keys for forwarding to an associated MHT. The buffer 280 has the same number of FIFO queues as the maximum number of input keys per clock cycle. As shown there are three queues FIFO 0 (282), FIFO 1 (284), and FIFO 2 (286) in operative communication with selection logic 288 and a multiplexor 290. Selection logic 288 transmits signals to multiplexor instructing which key to select from the buffer queue and send to MHT 292.

Keys are selected according a round robin approach. The selection logic selects a new key from $FIFO_i$, i=p+x (mod n) where x is the smallest positive number that meets the condition that FIFO, has a new key n is the number of FIFO queues (and input buffers), and p is the FIFO queue from which the circuit logic fetched the previous key in the previous time a key was fetched. In this example, the register p1 and p2 of logic table hold the last selection, and in the next to last row shown in the truth table for selection logic 294, it is shown that a key was previously from FIFO 1 (p1=0, p2=1). At this point, if only FIFO 1 has a new key (a=0, b=1, and c=0), selection logic signals multiplexor to access the key in FIFO B and forward it to MHT 294 for storage (q1=0, q2=1, e (enable signal)=1).

According to present principles, the hash table structures, e.g., the MHT and NMHT structures incorporating MHT structures, provide special advantages. The structures benefit from the associating buffers with hash tables, allowing for good throughput. In particular, the configurations of FIGS. 4, 5, 6 and 7, show good space efficiency that is comparable to MHT configurations with improved throughput. A large number of keys can be processed per clock cycle, and the forwarding procedure of FIG. 5 improves the throughput of inserting keys into storage blocks per clock cycle.

Figure 9:
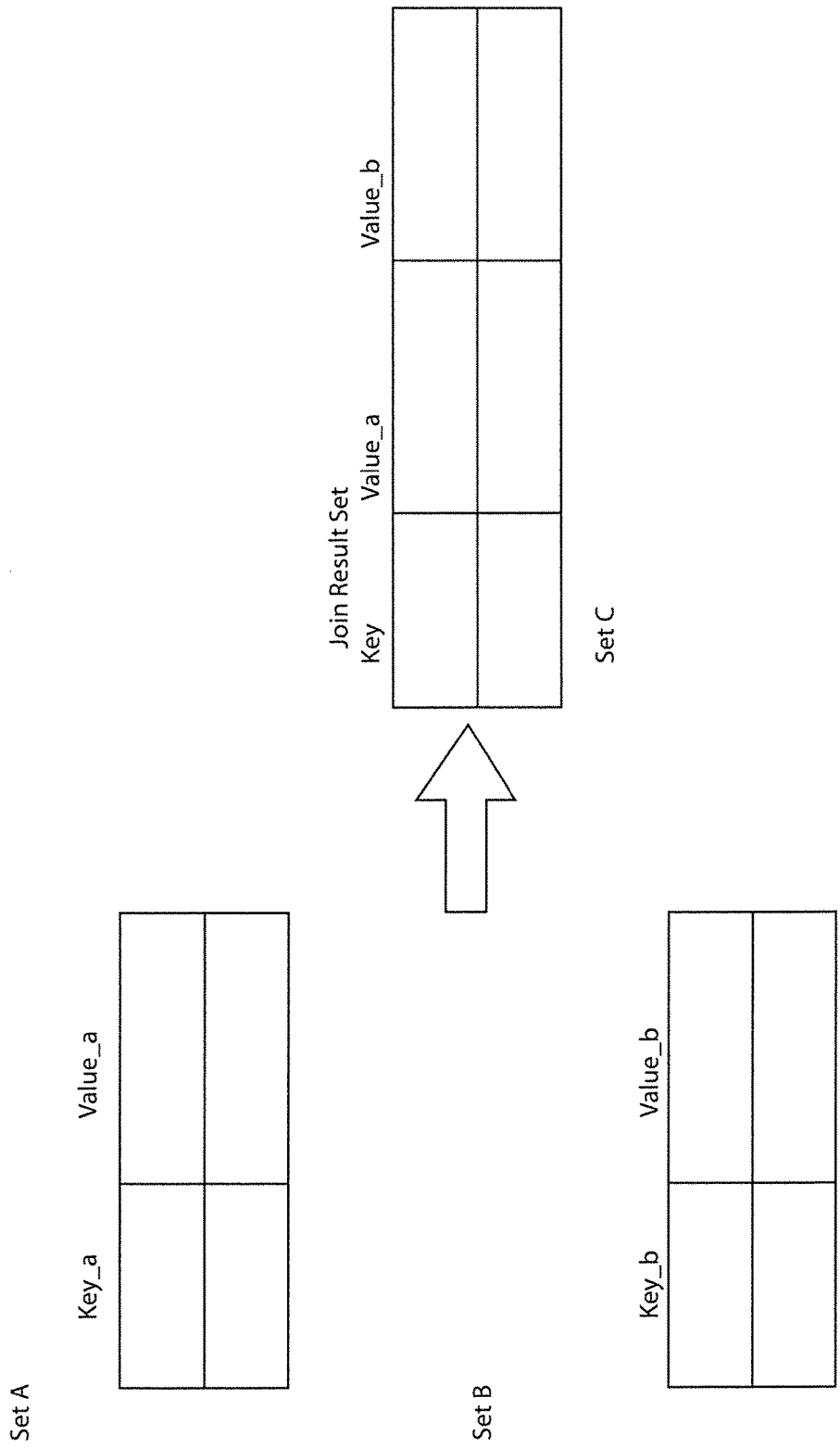
FIG. 9 shows the joining two sets containing the same keys, in accordance with an embodiment of the present principles.

Referring to FIG. 9, depicted is an approach to joining key-value pairs in two sets A and B. At first, a NMHT is used to build a hash table to store key-value pairs in Set A. When a NMHT is configured in a FPGA, multiple key-value pairs can be processed per clock cycle, and thus processing speed can be improved. After that, the key-value pairs in Set B pass through the NMHT to find the key-value pairs in Set A that have the same keys of the key-value pairs in Set B. The logic compares the keys to determine if in fact it is the same key that is stored in Set B. Search can be done with the lookup logic explained below. If the logic finds a matching key-value pair, then a "valid" signal is activated. Where keys are not the same, the signal is deactivated. Multiple pairs can be processed per clock cycle of the FPGA in accordance with this lookup approach.

To conserve storage, a join hash table is constructed from a concatenation of the existing rows. For example, as shown, the rows containing value $V_a$ and value $V_b$ from tables A and B that include the same key are joined in a new Set C.

The inserting a key-value pair t=(k,v) into the table could be effected by a circuit described as follows, with the understanding that keys are inserted into tables from left to right. The hash table uses different hash functions for each hash table to determine the address at which each key is stored. Each hash function returns an integer value between 0 and C−1, where C is the depth of the memory blocks (e.g., up to 256). Then, each hash table checks if the slot that the hash function points to is empty or not. The most significant bit (MSB) or least significant bit (LSB) of each entry in the memory blocks is used for indicating whether or not the slot is empty. If the slot is empty, the hash function inserts the key into the slot and activates an "inserted" signal. If the inserted signal is activated, the hash tables transfer incoming key-hash value pairs to the next hash table without insertion. The hash table overflows when the slot for the key at the right most hash table is not empty.

When looking up a key-hash value pair in a storage destination of a hash table, e.g., a memory block of a FPGA, a circuit is activated. Each hash table is checked to determine if the given key is stored in the specified slot pointed to by the hash function. If the key in the slot is the same as the given key, the key-hash value pair is the desired data. In this case, a "found" signal is activated and the found key-value pair is sent to the next hash table.

The MHT structure enables high throughput join operations. Furthermore, with a NMHT configuration, multiple key-value pairs can be joined per clock cycle, which improves the throughput of join operations.

Figure 10:
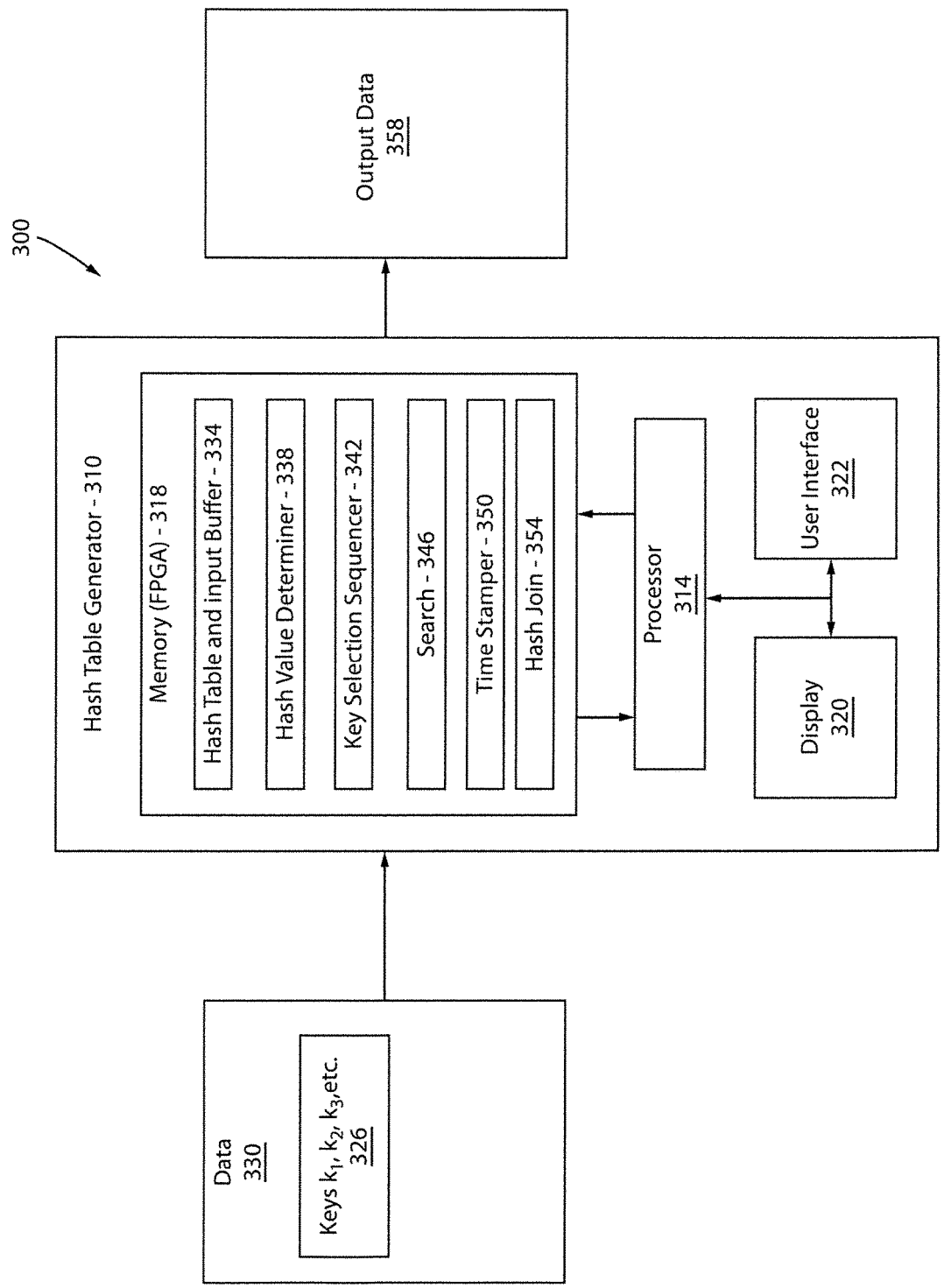
FIG. 10 shows an exemplary system for hash table storage, in accordance with an embodiment of the present principles.

With reference to FIG. 10, a system 300 for storing keys in a hash table is depicted that implements embodiments of the present principles is shown. Part or all of processing system 100 may be implemented in one or more of the elements of system 300.

Figure 11:
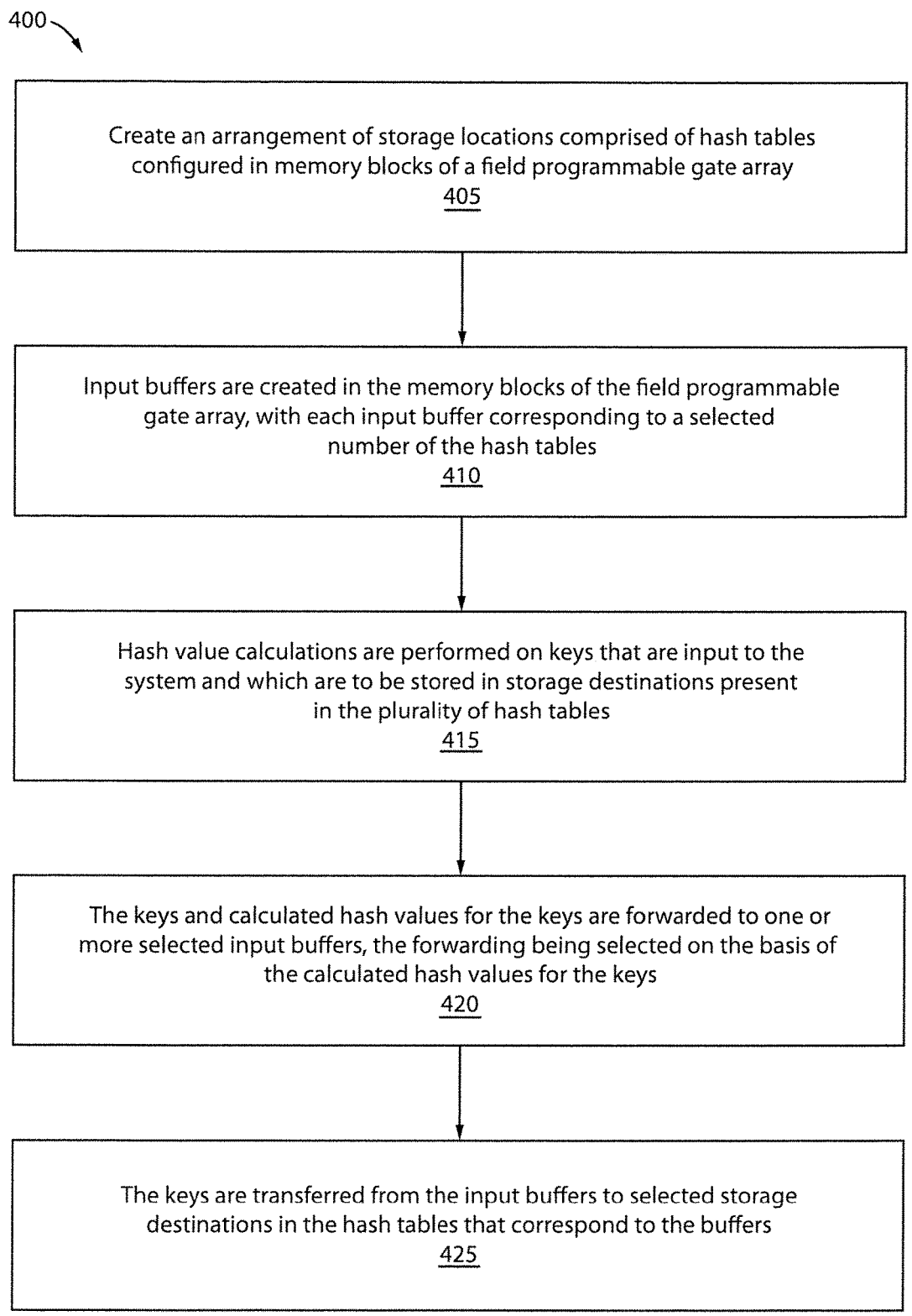
FIG. 11 shows an exemplary method for hash table storage, in accordance with an embodiment of the present principles.

Further, it is to be appreciated that processing system 100 may perform at least part of the method described herein including, for example, at least part of method 400 of FIG. 11. Similarly, part or all of system 300 may be used to perform at least part of method 400 of FIG. 11. System 300 is shown with respect to an operational environment in which it can be utilized, in accordance with an embodiment of the present principles.

System 300 preferably includes a hash table generator 310 that includes one or more processors 314 and memory 318 for storing applications, modules and other data. In one preferred embodiment, the memory unit 318 is a field programmable gate array which includes a vast number of memory blocks. The system 300 may also include one or more displays 320 for viewing content. The display 320 may permit a user to interact with the system and its components and functions. This may be facilitated by the inclusion of a user interface 322, which may include a mouse, joystick, or any other peripheral or control to permit user interaction with the system and/or its devices. It should be understood that the components and functions of the system may be represented as one or more discrete systems or workstations, or may be integrated as part of a larger system or workstation.

System 300 is depicted as a computer implemented approach for storing keys in a hash table, resulting in faster throughput and more efficient use of memory space. This is particularly true in the FPGA environment in which primitive operations should be completed in one clock cycle of the FPGA.

System 300 receives input 326, which may include keys $k_1$, $k_2$, $k_3$, etc. 330 to be processed by hash table generator 310 and stored in the hash tables 334. The input keys may be stored for a selected time duration in the memory unit 318 (e.g., FPGA) of hash table generator 310.

The hash table generator 310 includes hash table and input buffer module 334, a hash value determiner module 338, a key selection sequencer module 342, search module 346, time stamper module 350, and hash join module 354. In one embodiment of the present principles, one or more of the modules 334, 338, 342, 346, 350 and 354 are configured in the memory unit 318 that operatively communicates with the system processor 314.

The hash tables and input buffers module 334 creates configurations of hash tables and input buffers. For example, the module 334 may generate a configuration where, for example, a single input buffer 172 is associated with the multi-level hash table configuration 170 (FIG. 2). The module may generate a configuration where an input buffer is configured before a single hash table configured in a memory block, such as buffer 204 configured to receive keys for hash table 202 (FIG. 3). The module may generate the configurations of FIGS. 4 and 5, in which a plurality of a multi-level hash tables (MHT) are configured in a nested multi-level hash table (NMHT) arrangement, with an input buffer is associated with each MHT of this arrangement. See, e.g., buffer 234 that receives keys for storage in the multi-level hash table 232 in FIGS. 4 and 5.

The hash value determiner module 338 runs a number of different hash function algorithms. For example, determiner module 338 runs hash function algorithms on the keys that generate hash values that determine the input buffers to which the individual keys are sent, e.g., hash functions $H_1$ and $H_2$. Determiner 338 runs other hash function algorithms on the keys that determine the possible storage destination for the keys, e.g., the hash function algorithms that are used to decide where a key and its computed hash values are to be stored. For example, hash function algorithms $h_1$ and $h_2$ determine a hash value used to determine possible storage locations among the many hash tables that are generated. One or more hash functions may run in parallel and simultaneously on input keys in order to generate hash values used to make the input buffer selection determinations for the keys.

Hash value determiner module 338 may assign hash functions to work on a selected group of hash tables, such as the case with FIGS. 4 and 5, where hash function $H_1$ processes keys for the MHTs 232, 240 and 248 on the left side and hash function H2 processes keys for the MHTs 236, 244, and 248 on the right side. Further, as shown in FIG. 4, hash functions $h_1$, $h_2$, $h_3$, etc. determine hash values for tables 256, 257 and 258 that are embedded within MHT 248, for purposes of determining key storage locations in tables 256, 257 and 258. Still further, as shown in FIG. 5, hash value determiner is configured, through the determined hash functions, to forward a key to another input buffer when the initially selected input buffer is full, e.g., the key capacity of the input buffer has been reached. In this arrangement, one hash function, e.g., $H_1$ may forward a key to hash function $H_2$.

The key selection sequencer controls the flow of keys through the input buffers as they are passed to the hash tables where the keys are to be stored. The input buffers can receive the same number of keys as key inputs. In one embodiment, the key sequencer decides the next key to pass to a hash table by making a key-to-key comparison based on a round robin strategy. In one embodiment, the key selection sequencer may employ a selection logic coupled to key queues and a multiplexor unit, with the selection logic instructing the multiplexor which key to pass to the hash tables.

The hash table generator further includes a search module 346, for performing various lookup functions on the stored keys. In one embodiment, the search module forwards data on searched keys as output data 358, for further evaluation, processing, consideration, etc. In another embodiment, search module 346 is used to perform other functions on the keys, such as deletion of duplicate keys.

In one embodiment, the hash table generator has a time stamper module, for time stamping the keys. The time stamper module could stamp the keys as they enter the generator as input. It could time stamp the keys at the time they are stored in a hash table, or at an intermediate processing time, such as when hashed prior to storage. Time stamp information could be used by the searcher module 346 to determine which duplicate keys should be selected as a search result.

Hash join module 354 concatenates key-value pairs of multiple sets that have the same keys into a joined set. The FPGA logic offers high throughput in the joining operation because each row is processed in one clock cycle. When a NMHT configuration has been generated, the number of key-value pairs that can be processed per clock cycle is increased.

While elements 334, 338, 342, 346, 350 and 354 (and the generated hash tables, hash functions, buffers, sets, etc.) are described as implemented in FPGAs, they could be implemented in other hardware devices, e.g., implemented in application specific integrated circuits (ASICS). The present principles could also be software implemented. These and variations to the elements of system 300 are readily contemplated by one of ordinary skill in the art given the teachings of the present principles provided herein, while maintaining the spirit of the present principles.

Referring to FIG. 11, an exemplary method 400 of hash table storage, in accordance with an embodiment of the present principles, is shown.

In block 405, an arrangement of storage locations comprised of hash tables configured in memory blocks of a field programmable gate array are created.

In block 410, input buffers are created in the memory blocks of the field programmable gate array, with each input buffer corresponding to a selected number of the hash tables. As described previously, there are numerous way in which input buffers can be associated with hash tables and different hash table configurations.

In block 415, hash value calculations are performed on keys that are input to the system and which are to be stored in storage destinations present in the plurality of hash tables. Hash value calculations may be performed in many different ways for different purposes, as described above. In one exemplary embodiment, for each key, a first hash value is determined with a first hash function to select one or more input buffers where the keys are to be sent, and then a second hash value is determined for each key by running a second hash function which determines the possible storage destinations in the hash tables for each key.

In block 420, the keys and calculated hash values for the keys are forwarded to one or more selected input buffers, the forwarding being selected on the basis of the calculated hash values for the keys, as previously described.

In block 425, the keys are transferred from the input buffers to selected storage destinations in the hash tables that correspond to the buffers.

The multi-level hash table in accordance with present principles offers several advantages, such as, e.g.:

Good and efficient use of memory block space;

Improved throughput, e.g., the number of keys processed in each clock cycle is significantly greater;

NMHT structures reduce latency when compared to MHT structures; and

Key forwarding when a buffer is full improves key insertion throughput.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 12:
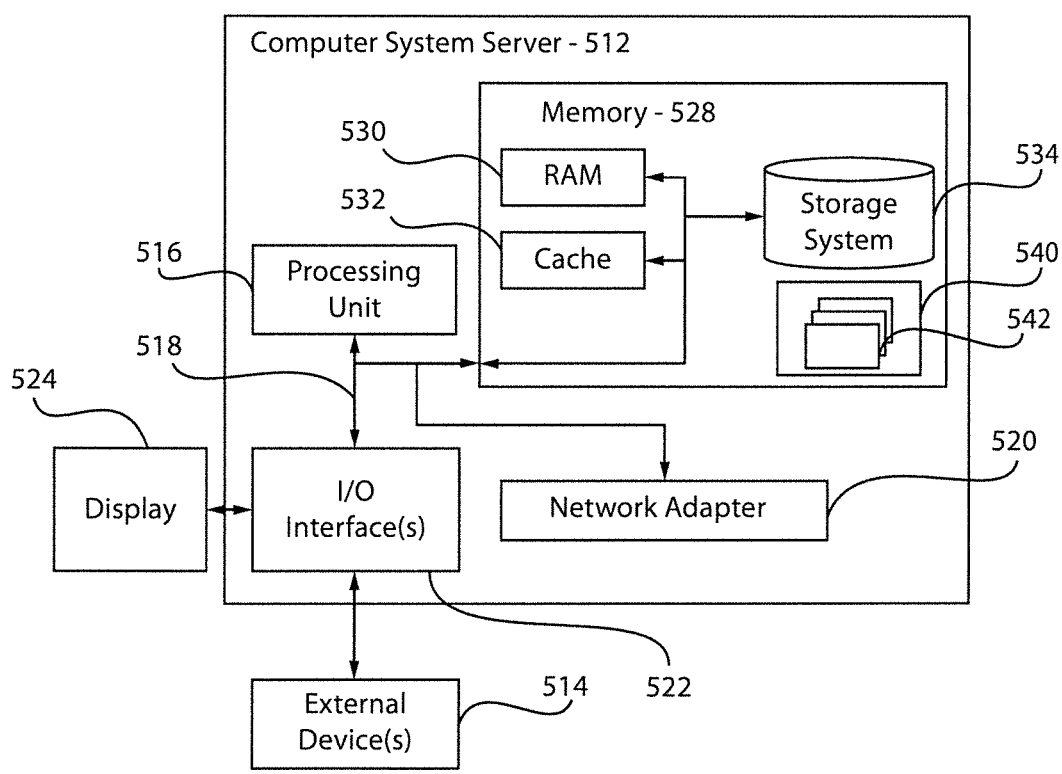
FIG. 12 shows an exemplary cloud computing node in accordance with an embodiment of the present principles.

Referring now to FIG. 12, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 13:
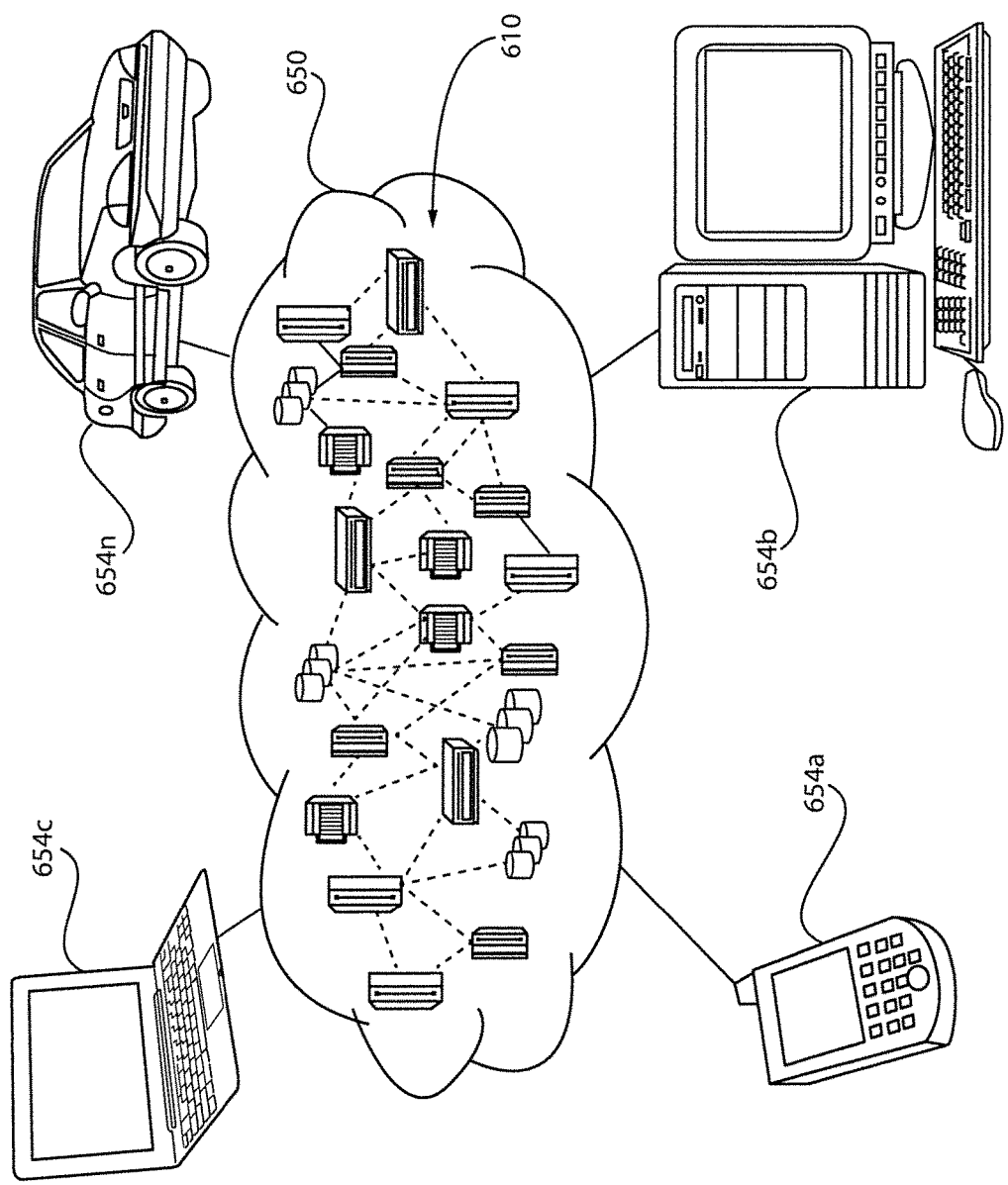
FIG. 13 shows an exemplary cloud computing environment in accordance with an embodiment of the present principles.

Referring now to FIG. 13, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 13 are intended to be illustrative only and that computing nodes 610 and cloud computing environment 650 can communicate with any type of computerized device over any type of network and/or network addressable connection (e.g., using a web browser).

Figure 14:
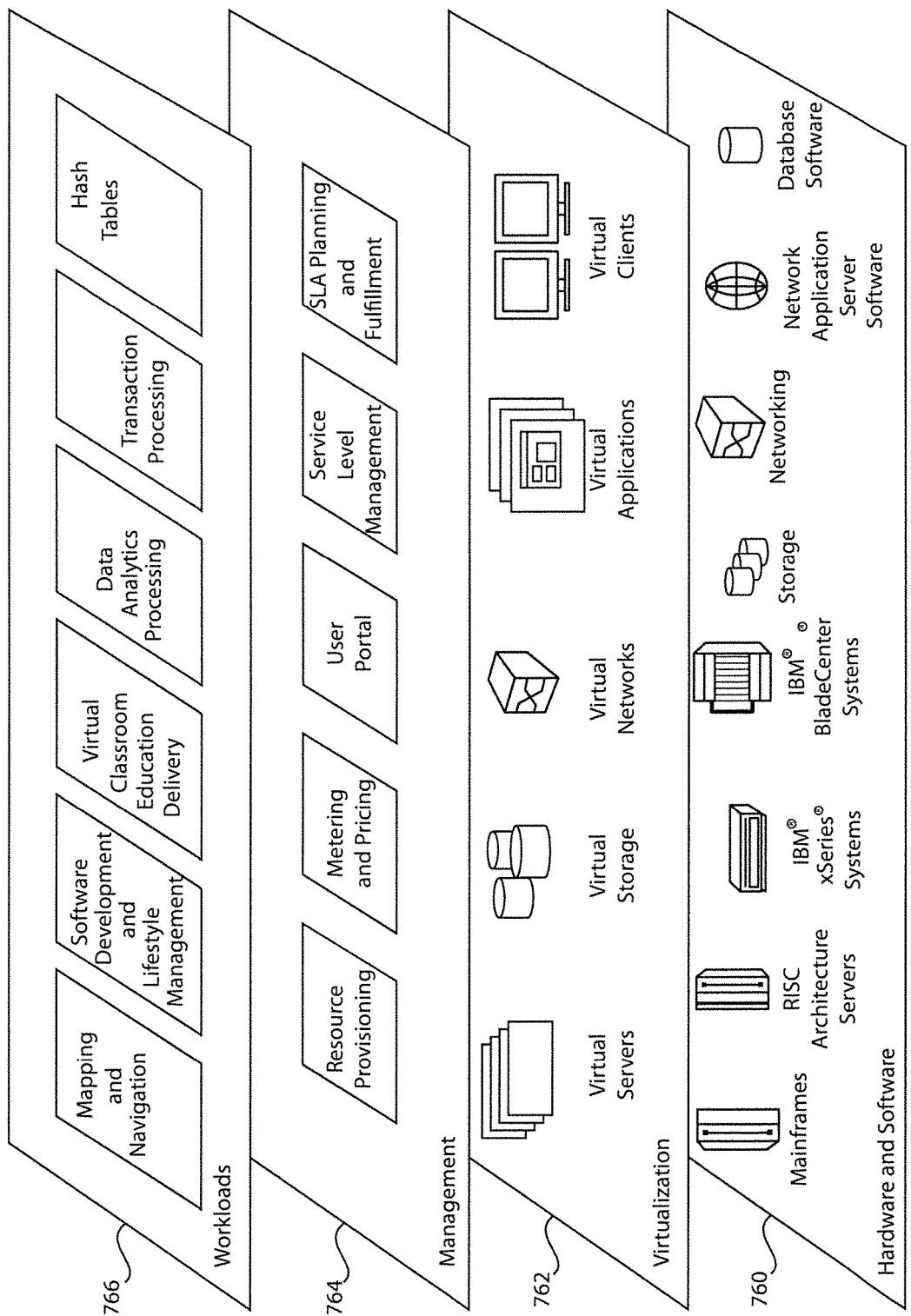
FIG. 14 shows exemplary abstraction model layers, in accordance with an embodiment of the present principles.

FIG. 14 shows a set of functional abstraction layers provided by cloud computing environment 650. It should be understood in advance that the components, layers, and functions shown in FIG. 14 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data storage in hash table structures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for creating hash tables and storing data in same, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method of hash table storage, comprising:
    creating input buffers in a computer hardware device, with each input buffer being associated with one or more selected hash tables;
    performing one or more hash value calculations to determine selected input buffers and storage destinations in the hash tables on keys to be stored in storage destinations present in the plurality of hash tables;
    forwarding keys and calculated hash values to one or more selected input buffers, the input buffers being selected on the basis of the calculated hash values for the keys; and
    transferring the keys from the input buffers to selected storage destinations in the hash tables that are associated with the buffers, the storage destinations being selected on the basis of the calculated hash values for the keys, with multiple keys being processed and stored in hash tables in each clock cycle of the computer hardware device to effect an improvement in hash table processing efficiency of the computer hardware device.

2. The computer implemented method of claim 1, further comprising creating a nested multi-level hash table configuration comprising storage locations configured as multilevel hash tables;
    creating input buffers that are associated with each of the multilevel hash tables;
    performing parallel hash value calculations on multiple keys to select input buffers for the multi-level hash tables and storage destinations in the multi-level hash tables;
    forwarding keys and calculated hash values to one or more selected input buffers associated with the multilevel hash tables, the input buffers being selected on the basis of the calculated hash values of the keys; and
    transferring the keys from the input buffers to selected storage destinations in the multilevel hash tables associated with the buffers, the storage destinations being selected on the basis of the calculated hash values for the keys.

3. The computer implemented method of claim 2, further comprising forwarding a key to another input buffer that differs from the determined input buffer when the determined input buffer is full; and
    transferring the key from the another input buffer to a selected storage destination in the multilevel hash table associated with the another input buffer.

4. The computer implemented method of claim 2, further comprising simultaneously performing parallel first hash value calculations on multiple keys to be stored in storage destinations selected from among a first selected group of multilevel hash tables with a first hash value calculator and simultaneously performing second parallel hash value calculations on multiple keys to be stored in storage destinations selected from among a second selected group of multilevel hash tables with a second hash value calculator.

5. The computer implemented method of claim 1, wherein the computer hardware device is a field programmable gate array.

6. The computer implemented method of claim 2, wherein the computer hardware device is a field programmable gate array.

7. The method of claim 6, further comprising selecting a key from among keys in the key queues for transfer to a multi-level hash table with a key-to-key comparison based on a round robin strategy.

8. The method of claim 1 further comprising performing a search on stored keys to identify duplicate keys and deleting all but one of the duplicate keys.

9. The method of claim 1 further comprising time stamping each key to provide each key with a time stamp;
    performing a search on stored keys to identify duplicate keys; and
    deleting all but one of the duplicate keys on the basis of the time stamps of each key.

10. The method of claim 1 further comprising performing a search on stored keys to find if the same key is stored; and
    creating a joined set from the key-value pairs that have the same keys.

11. A system for hash table storage, comprising:
    a hash table and input buffer generator configured in memory blocks of a field programmable gate array that generates hash tables and input buffers, the input buffers being configured for receiving keys to be stored in the hash tables and for distributing the keys to one or more hash tables on the basis of determined hash values of the keys;
    a hash value determiner that calculates hash values of the keys and forwards the keys and calculated hash values to selected input buffers on the basis of the determined hash values; and
    a key selection sequencer, for selecting a key from among keys in the input buffers for transfer to a hash table.

12. The system of claim 11, wherein the hash value determiner is configured to determine the hash value of keys a first time with a first hash function to select the input buffers where keys are to be forwarded and at least a second time with a second hash function to select storage destinations of the keys in the hash tables.

13. The system of claim 11, wherein the hash table and input buffer generator is configured to generate a nested multi-level hash table structure that is comprised of multi-level hash tables and is configured to generate input buffers that are associated with the multi-level hash tables, with each input buffer being associated with a multi-level hash table;
    the hash value determiner being configured to perform parallel hash function operations that determine hash values for multiple keys to be stored in storage destinations present in the multilevel hash tables and to forward keys and determined hash values to one or more selected input buffers on the basis of the determined hash values of the keys.

14. The system of claim 13, wherein the hash value determiner is configured to forward a key to another input buffer that differs from the selected input buffer when the selected input buffer is full.

15. The system of claim 13, wherein the hash value determiner is configured to run a first hash function in association with selected multi-level hash tables and their input buffers and run a second hash function in association with selected dissimilar multi-level hash tables and their input buffers.

16. The system of claim 13, wherein the hash value determiner is configured to determine the hash value of keys a first time with a first hash function to select the input buffers where keys are to be forwarded and at least a second time with a second hash function to select storage destinations of the keys in the multi-level hash tables.

17. The system of claim 11, further comprising a key search module for performing searches on stored keys.

18. The system of claim 11, further comprising a time stamper, for time to provide each key with a time stamp to identify the time that the key was stored in a hash table.

19. The method of claim 11, further comprising a joiner for concatenating key-value pairs that have same keys.

20. A computer program product of hash table storage, the computer program product comprising a non-transitory computer readable storage medium having program instructions embodied therewith, the program instructions being executable by a computer to cause the computer to perform a method comprising:
    creating input buffers in memory blocks of a field programmable gate array, with each input buffer being associated with one or more hash tables;
    performing one or more hash value calculations to determine selected input buffers and storage destinations in the hash tables on keys to be stored in storage destinations present in the plurality of hash tables;
    forwarding keys and calculated hash values to one or more selected input buffers, the input buffers being selected on the basis of the calculated hash values for the keys; and
    transferring the keys from the input buffers to selected storage destinations in the hash tables that are associated with the buffers, the storage destinations being selected on the basis of the calculated hash values for the keys.

* * * * *